United States Patent
Chen et al.

(10) Patent No.: US 7,116,845 B2
(45) Date of Patent: Oct. 3, 2006

(54) SCANNER WITH A REFERENCE PATTERN FOR MERGING IMAGES AND METHOD OF MERGING IMAGES

(75) Inventors: Michael Chen, Hsinchu (TW); Jeau-Jeau Ku, Hsinchu (TW); Leo Liao, Hsinchu (TW)

(73) Assignee: Avision Inc., Hsinchu (TW)

( * ) Notice: Subject to any disclaimer, the term of this patent is extended or adjusted under 35 U.S.C. 154(b) by 1049 days.

(21) Appl. No.: 10/050,717

(22) Filed: Jan. 18, 2002

(65) Prior Publication Data

US 2002/0105683 A1 Aug. 8, 2002

(30) Foreign Application Priority Data

Feb. 2, 2001 (TW) .............................. 90102298 A

(51) Int. Cl.
*G06K 9/00* (2006.01)
*G06K 9/36* (2006.01)
*H04N 1/04* (2006.01)

(52) U.S. Cl. ........................ 382/318; 382/284; 358/474
(58) Field of Classification Search ................ 382/254, 382/284, 287, 318, 319; 358/474, 505, 537, 358/496, 3.26, 462; 399/144
See application file for complete search history.

(56) References Cited

U.S. PATENT DOCUMENTS

| | | | |
|---|---|---|---|
| 5,687,010 A * | 11/1997 | Van Tilborg et al. | 358/496 |
| 6,385,346 B1 * | 5/2002 | Gillihan et al. | 382/254 |
| 6,470,099 B1 * | 10/2002 | Dowdy et al. | 382/287 |
| 6,728,008 B1 * | 4/2004 | Kamisuwa | 358/474 |

* cited by examiner

*Primary Examiner*—Kanjibhai Patel

(57) ABSTRACT

Using a reference pattern of the invention, discontinuous images caused by inadequate memory can be merged precisely. The reference pattern can be applied to both the flat bed scanner and the Automatic Document Feed (ADF) scanner.

10 Claims, 4 Drawing Sheets

SCANNER WITH A REFERENCE PATTERN FOR MERGING IMAGES AND METHOD OF MERGING IMAGES

BACKGROUND OF THE INVENTION

This application incorporates by reference Taiwanese application Serial No. 90102298, Filed Feb. 2, 2001.

1. Field of the Invention

The invention relates in general to a scanner and a method for merging images, and in particular, to a scanner with a reference pattern for merging images and a method for the same.

2. Description of the Related Art

As it is well known in the art, optical scanners produce machine-readable data which are representative of the scanned object, e.g. a page of printed text. Most optical scanners employ line-focus systems in which light from an illuminated scan line on the object is imaged by a lens onto a linear photosensor array or detector positioned remotely from the object. The linear photosensor array is typically a single dimension array of photoelements that correspond to small area locations along the illuminated scan line. These small area locations are commonly referred to as "picture elements" or "pixels." Each photoelement produces a data signal that is representative of the intensity of the light from the corresponding pixel. The data signals from the photoelements are received and processed by an appropriate data processing system which may subsequently store the data on a suitable medium or generate a display signal, from which an image of the object is reproduced using a display device such as a CRT or a printer.

Scanners with high resolution need to be accompanied with high-capacity memories because images with higher resolution require more memory space. However, when the issue of cost is considered, increasing the memory is not a cost effective solution. Instead, multi-step scanning is used to solve the problem of inadequate memory. That is, a whole image can be divided into smaller pieces and each partial image is scanned at one time. In multi-step scanning, the issue of precisely merging each partial image soon arises.

Conventionally, if the memory is inadequate, the carriage slows down until it stops completely, and where the carriage is located is called the image scan line. The carriage is driven to move back to the image merging scan line, and then continues the scanning process. The carriage is driven by a step motor, and the slow-down and speed-up motion of the carriage is usually unstable and even shakes seriously. As a result, the images captured as the carriage slows down and speeds up are not clear.

FIG. 1 shows a conventional flat bed scanner 100 with a multi-step scanning function. The scanner 100 includes a carriage 102, which scans a document 106 lying on the scan area 104. If the memory (not shown) of the scanner 100 is inadequate to store the image data, the carriage 102 is positioned at one of the scan lines, which is called the image merging scan line L1. The process of driving the carriage 102 back to the image merging scan line L1 is described as follows. First, the carriage 102 slows down from the image merging scan line L1 and moves along the scan direction for a distance W, from left to right as the arrow shown in FIG.1. Eventually, the carriage 102 stops at a stopping scan line L2. The distance W is controlled by a step motor (not shown) and thus can be transformed into Y steps. Please note that the slow-down motion of the carriage 102 is unstable and can even shake. Next, the carriage 102 is driven for Y steps from the stopping scan line L2 to the image merging scan line L1 along the direction shown by the arrow in FIG. 1 from right to left. During the motion of returning to the image merging scan line Li, the carriage may also shake.

Furthermore, the tension of the transmission belt used for driving the carriage 102 during forward and backward motion is not equal. As a result, the carriage still cannot reach the image merging scan line L1 precisely, thus producing an unclear image, even though the step motor drives the carriage 102 back for Y steps.

A method is proposed to overcome the aforementioned error. By comparing the image similarity, it is ensured that the carriage 102 returns back precisely to the image merging scan line L1, which is described as follows. The image of the document 106, which the carriage 102 captures at the image merging scan line, is defined as a standard image. The carriage 102 will not continue to capture images until an image with high similarity as the standard image is found during its forward motion after the backward motion. However, images with high similarity can occur in several parts in a single document, such as a blank space. This could result in mis-recognition of the standard image and further problems such as image overlapping and gaps.

SUMMARY OF THE INVENTION

It is therefore an object of the invention to provide a scanner, which has a reference pattern to facilitate image merging.

An object of the invention is to provide a flat bed scanner. The flat bed scanner comprises a scan area for placing a document to be scanned, a carriage for scanning the document to obtain images before and after the carriage stops, and a reference pattern. The reference pattern is positioned at one side of the scan area, wherein the images can be merged precisely by using the carriage to detect the reference pattern.

According to another object of the invention, an automatic document feed (ADF) scanner is further disclosed. The ADF scanner comprises a carriage, a reference roller located at an area detectable by the carriage, and a reference pattern rolled up and attached at one end of the reference roller so that the reference pattern rolls along with the reference roller, wherein the carriage scans the document to obtain images before and after the reference roller stops, and the images can be merged precisely by using the carriage to detect the reference pattern.

Still another object of the invention is to provide a method of merging images in a flat bed scanner, the scanner comprising a carriage, a scan area, and a reference pattern located at one side of the scan area. The carriage scans a document to obtain the images before and after the carriage stops. The method of merging images comprises:

(a) detecting two intersect points of an image merging scan line and the reference pattern, and determining the distance therebetween, wherein the distance between the two intersect points is defined as a first interval and a scan line where the carriage positions, while a memory of the scanner is inadequate, is defined as the image merging scan line;

(b) slowing down and moving the carriage in a first direction and stopping at a scan line defined as a first stopping scan line;

(c) moving the carriage in a second direction opposite to the first direction, starting from the first stopping scan line, passing the image merging scan line, slowing down and to a stop at a second stopping scan line;

(d) moving the carriage in the first direction from the second stopping scan line, wherein a stable scan line is where the carriage starts to move stably;

(e) detecting two intersect points of the stable scan line and the reference pattern, and determining the distance therebetween, wherein the distance between the two said intersect points is defined as a second interval, and determining the migration distance by the first interval and the second interval, using a logic operation; and (f) moving the carriage from the stable scan line along the first direction and continuing the scanning after the carriage reaches the image merging scan line.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

Using a reference pattern of the invention, discontinuous images caused by inadequate memory can be merged precisely. The reference pattern can be applied to both the flat bed scanner and the Automatic Document Feed (ADF) scanner.

The carriage of the flat bed scanner is not fixed but moves during scanning. Thus, the reference pattern needs to be positioned in an area detectable by the carriage. The detectable area is defined by all the scan lines and is typically broader than the scan area. Therefore, the reference pattern is positioned outside the scan area but within the detectable area, preferably at one side of the scan area so that the reference pattern can be successfully detected without concealing the document to be scanned.

On the other hand, the carriage of the ADF scanner is fixed during scanning. The document to be scanned is transmitted directly or indirectly by a number of roller sets to a carriage detectable area. The reference pattern of the invention is rolled up and positioned at one end of a reference roller substantially above the carriage. The reference pattern rolls along with the reference roller so that the reference pattern can be detected by the carriage. The two kinds of scanners with reference patterns for merging images and the methods of merging images are illustrated in more detail by the following two examples.

EXAMPLE 1

Figure 1:
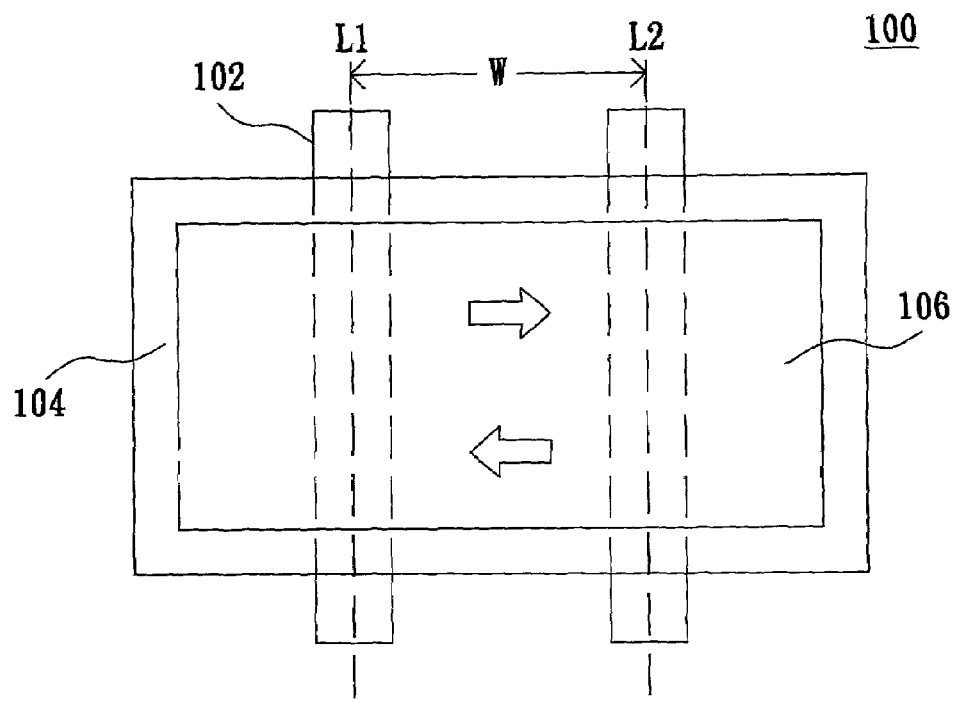
FIG. 1 shows a conventional flat bed scanner with a multi-step scanning function.
Figure 2:
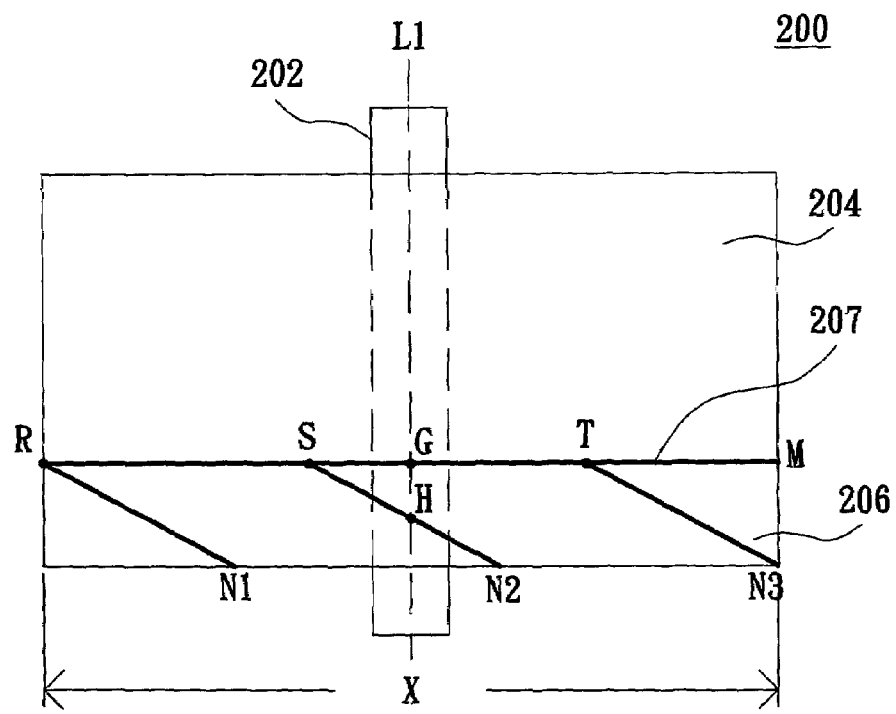
FIG. 2 illustrates a flat bed scanner with a reference pattern for merging images according to a preferred embodiment of the invention.

Referring to FIG. 2, a flat bed scanner with a reference pattern for merging images according to a preferred embodiment of the invention is illustrated. The scanner 200 includes a carriage 202, a scan area 204 and a reference pattern 206. The reference pattern 206 is positioned at one side 207 of the scan area 204 and can also be detected by the carriage 202. The reference pattern is designed to have the same width W2 as that of the scan area 204. A dotted line L1 is the scan line where the carriage 202 stops if the memory of the scanner is inadequate, and is thus defined as an image merging scan line.

According to the invention, the reference pattern 206 is designed to have graphs, curves, or straight line segments, which benefit the carriage 202 in identifying the image merging scan line L1. According to a preferred embodiment of the invention, the reference pattern 206 includes a straight line segment M, parallel to the side 207 of the scan area 204, and a number of oblique line segments in a function with one-to-one mapping. Preferably, all the oblique line segments in the one-to-one mapping function have the same slope and are parallel to each other. However, the oblique line segments in the one-to-one mapping function can be other graphs and are not limited to straight line segments. Any one scan line intersects the straight line segment M at one and only one point, and any one scan line intersects one of the graphs in the one-to-one mapping function at one and only one point.

To illustrate the invention simply, a reference pattern with a straight line M, which is parallel to the side 207, and three parallel line segments in the one-to-one mapping function, N1, N2, and N3, is taken as an example. The line segments N1, N2, and N3 intersect the straight line segment M at points R, S, and T, respectively. The image merging scan line L1 intersects the straight line segment M at point G and intersects one of three parallel line segments, N2, at H in the one-to-one mapping function.

Figure 3A:
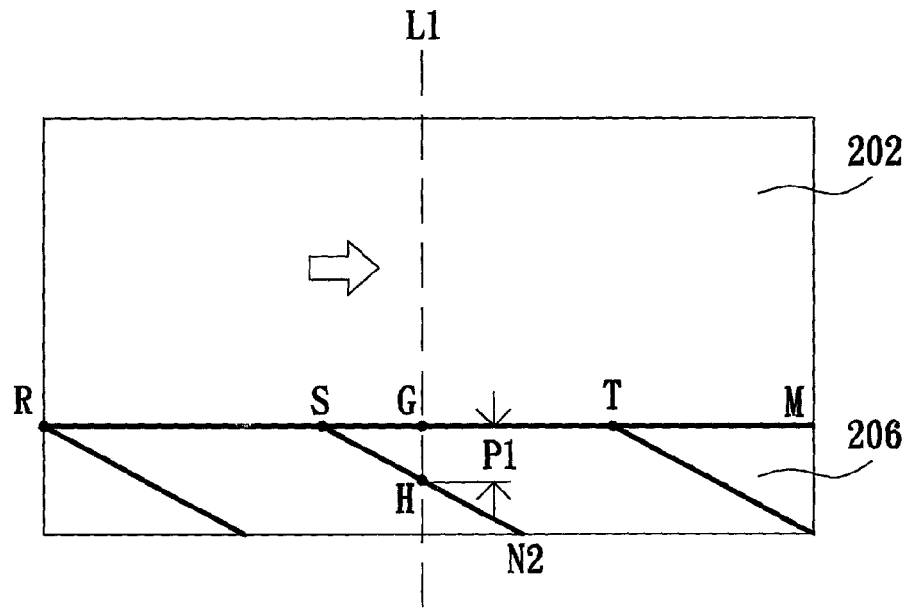
FIGS. 3A to 3D illustrate the method of merging images of the invention.

The method of merging images, according to an embodiment of the invention, is illustrated in FIGS. 3A to 3D. Referring first to FIG. 3A, if the memory of the scanner 200 is inadequate, the carriage 202 is positioned at the image merging scan line L1 and detects the two intersect points G and H. Then, the distance P1 between points G and H is counted and recorded. Next, the carriage 200 slows down and moves along the original scan direction, from left to right, as shown by the arrow in FIG. 3A.

Figure 3B:
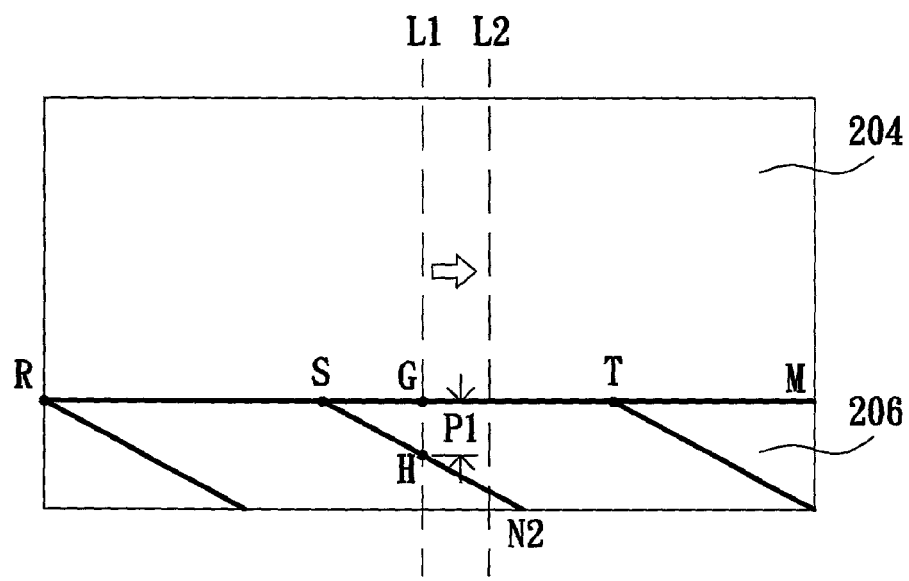
Figure 3C:
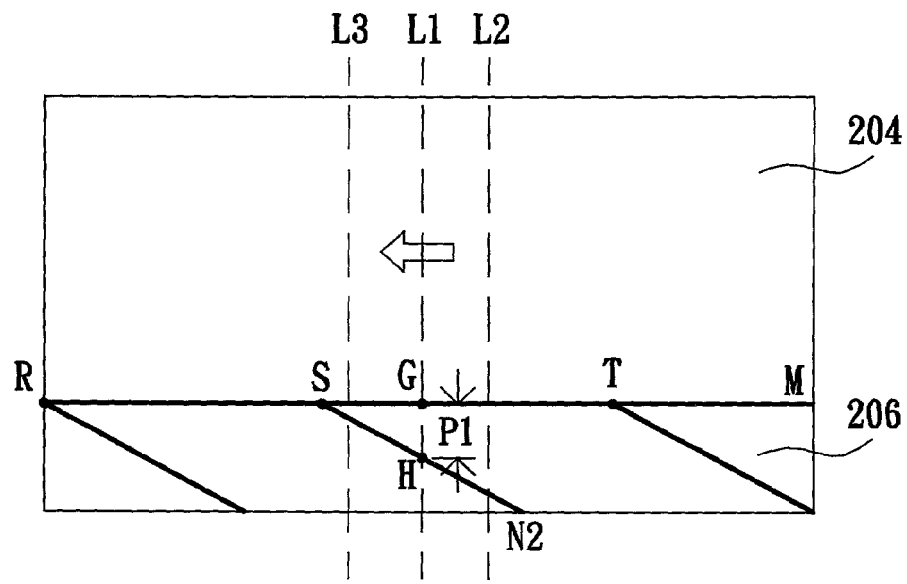

In FIG. 3B, the carriage slows down to a stop at a stopping scan line L2. The distance between the image merging scan line L1 and the stopping scan line L2 is determined. The slow-down motion of the carriage 202 is usually unstable and can even shake. Next, referring to FIG. 3C, the carriage 202 is driven by the step motor to move backward and pass the image merging scan line L1. Then the carriage 202 slows down and finally stops at the stopping scan line L3. The image merging scan line L1 is thus between the stopping scan lines L2 and L3. The distance between the image stopping scan lines L2 and L3 is controlled by the step motor. The motion of the carriage 202, from the stopping scan line L2 to the stopping scan line L3, is unstable and can even shake violently.

Figure 3D:
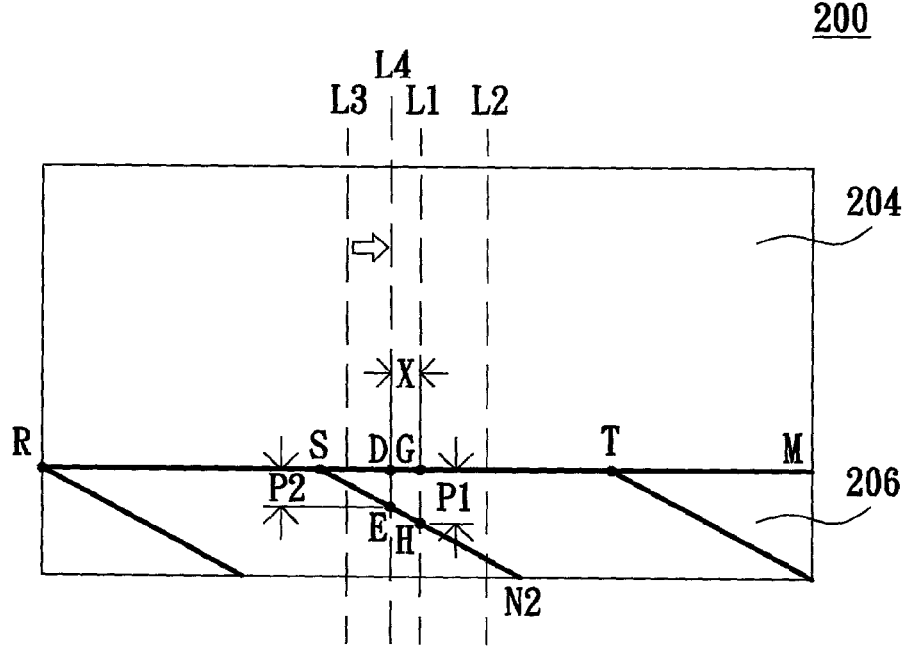

Then, referring to FIG. 3D, the carriage 202 is driven toward the image merging scan line L1. The stable scan line L4 is where the carriage 202 starts to move stably. The stable scan line L4 is between the image merging scan line L1 and the stopping scan line L3. The stable scan line L4 intersects the line segment M at a point D and intersects the line segment N2 at a point E. The points D and E are both detected by the carriage 202, and the distance P2 between the points D and E is then counted and recorded. The unstable motion of the carriage from the image merging scan line L1 to the stopping scan line L2, the stopping scan line L3, and the stable scan line L4 usually causes an unclear image or overlapping image, which is preferably not used.

The distance X between points D and G is the distance between the stable scan line L4 and the image merging scan line L1, and this distance X can then be determined by logic operation. The carriage 202 travels from the stable scan line L4 for a distance X, until it reaches the image merging scan line L1. Thus, the distance X can be defined as the migration distance. The picture captured between the stable scan line L4 and the image merging scan line L1 overlaps with a portion of the image captured before the memory runs out so that it is not used. Only the picture captured after the image merging scan line will be used to complete the whole image.

EXAMPLE 2

Figure 4A:
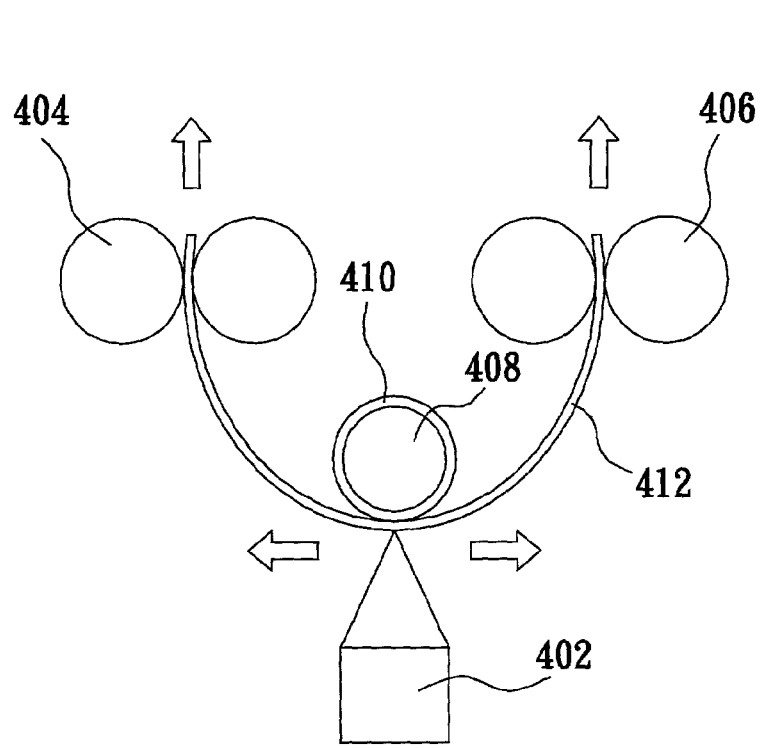
FIG. 4A illustrates an ADF scanner with a reference pattern for merging images according to a preferred embodiment of the invention.

Referring to FIG. 4A, an ADF scanner with a reference pattern for merging images according to another preferred embodiment of the invention is illustrated. The ADF scanner 400 comprises a carriage 402, roller sets 404 and 406, a reference roller 408, and a reference pattern 410. The reference roller 408 is located at an area, which can be detected by the carriage 402. The reference pattern 410 is rolled up and attached at one end of the reference roller 408. The reference roller 408 rolls along with the rolling of the roller sets 404 and 406, while the roller sets 404 and 406 are driven by a step motor (not shown.) Thus, the document 412 moves along the scan direction from left to right, as shown by the arrow in FIG. 4A.

Figure 4B:
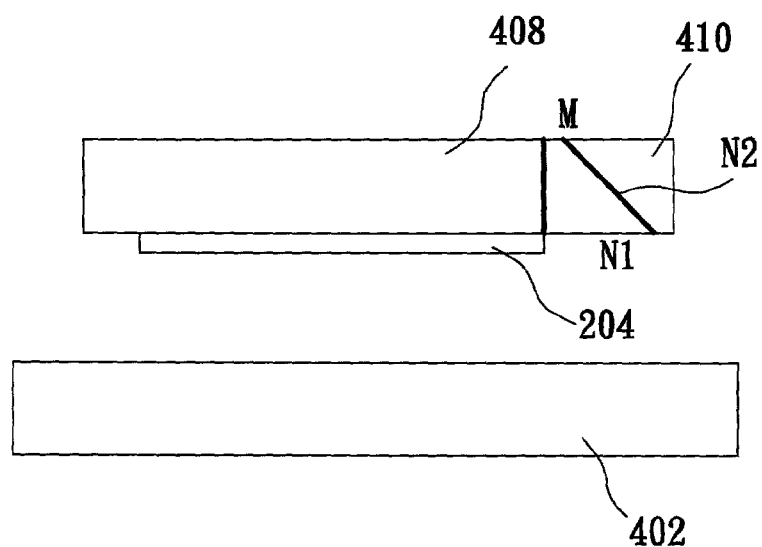
FIG. 4B shows the side view of the reference roller and the carriage in FIG. 4A.

FIG. 4B shows the side view of the reference roller 408 and the carriage 402 in FIG. 4A. To ensure that the reference pattern 410 can be detected by the carriage 402, the reference roller 408 is designed to be wider than the document 412 and the reference pattern 410 is preferably positioned at the end of the reference roller 408, where is not hindered by the document 412. The reference pattern 410 is formed by rolling up the reference pattern 206 as described in Example 1.

Similar to the operation described in Example 1, if the memory of the scanner 400 is inadequate, the carriage 402 detects two respective points of the straight line segment M and the line segment N2, and the first distance between these two points is determined. Next, controlled by the step motor, the document 412 moves along with the reference roller 408 from right to left as shown by the arrow in FIG. 4A. Then, two respective points of the straight line segment M and the line segment N2 are detected and a second distance between these two points is determined. According to the logic operation of the first distance and the second distance, the step motor drives the roller sets 404 and 406, and the reference roller 408 rolls along with the roller sets 404 and 406. Thus, the image merging scan line of the document 412 is transmitted above the carriage 402 and the scanning procedure can be further continued.

According to the scanner and method disclosed above, images can be merged more speedily and precisely. The advantages of the current invention are mainly due to the application of the reference pattern.

What is claimed is:

1. A flat bed scanner, comprising:
    a scan area for positioning a document to be scanned;
    a carriage for scanning the document to obtain a plurality of partial images before and after the carriage stops; and
    a reference pattern positioned at one side of the scan area, wherein, by using the carriage to detect the reference pattern, the partial images can be merged precisely to form a whole image; wherein the reference pattern comprises: a plurality of graphs in a one-to-one mapping function; and a straight line segment parallel to said one side of the scan area, wherein any one scan line intersects the straight line segment at one and only one point, and any one scan line intersects one of the graphs at one and only one point.

2. The flat bed scanner as claimed in claim 1, wherein the graphs in the one-to-one mapping function are a plurality of oblique line segments.

3. The flat bed scanner as claimed in claim 2, wherein the oblique line segments have equal slope.

4. An Automatic Document Feeder (ADF) scanner, comprising:
    a carriage;
    a reference roller located at an area detectable by the carriage, wherein a document to be scanned rolls along with the rolling of the reference roller; and
    a reference pattern rolled up and attached at one end of the reference roller so that the reference pattern rolls along with the reference roller, wherein the carriage scans the document to obtain a plurality of partial images before and after the reference roller stops, and by using the carriage to detect the reference pattern, the partial images can be merged precisely to form a whole image; wherein the reference pattern comprises: a plurality of graphs in one-to-one mapping function; and
    a straight line segment, wherein any one scan line intersects the streight line segment at one and only one point, and any one scan line intersect one of the graphs at one and only one point.

5. The ADF scanner as claimed in claim 4, wherein the graphs in the one-to-one mapping function are a plurality of oblique line segments.

6. The ADF scanner as claimed in claim 5, wherein the oblique line segments have equal slope.

7. A method of merging a plurality of partial images to form a whole image in a flat bed scanner, wherein the scanner comprises a carriage, a scan area and a reference pattern located at one side of the scan area, and the carriage scans a document to obtain the plurality of partial images before and after the carriage stops, wherein the method comprises:
    (a) detecting two intersect points of an image merging scan line and the reference pattern and determining the distance therebetween, wherein the distance between said two intersect points is defined as a first interval and a scan line where the carriage positions, while a memory of the scanner is inadequate, is defined as the image merging scan line;
    (b) slowing down and moving the carriage in a first direction and stopping at a scan line defined as a first stopping scan line;
    (c) moving the carriage in a second direction opposite to the first direction, starting from the first stopping scan line, passing the image merging scan line, slowing down and to a stop at a second stopping scan line;
    (d) moving the carriage in the first direction from the second stopping scan line, wherein a stable scan line is where the carriage starts to move stably;
    (e) detecting two intersect points of the stable scan line and the reference pattern and determining the distance therebetween, wherein the distance between said two intersect points is defined as a second interval, and determining a migration distance by the first interval and the second interval, using a logic operation; and (f) moving the carriage from the stable scan line along the first direction and continuing scanning after the carriage reaches the image merging scan line.

8. The method of merging images as claimed in claim 7, wherein the reference pattern comprises:
   a plurality of graphs in a one-to-one mapping function; and
   a straight line segment parallel to one side of the scan area, wherein any one scan line intersects the straight line segment at one and only one point, and any one scan line intersects one of the graphs in the one-to-one mapping function at one and only one point.

9. The method of merging images as claimed in claim 8, wherein the graphs in the one-to-one mapping function are a plurality of oblique line segments.

10. The method of merging images as claimed in claim 9, wherein the oblique line segments have equal slope.

* * * * *